(12) United States Patent
Haussmann et al.

(10) Patent No.: US 12,521,898 B2
(45) Date of Patent: Jan. 13, 2026

(54) ISOLATOR

(71) Applicant: HECHT Technologie GmbH, Pfaffenhofen/Ilm (DE)

(72) Inventors: Matthias Haussmann, Pfaffenhofen/Ilm (DE); Thomas Schwaiger, Pfaffenhofen/Ilm (DE); Josef Heinzinger, Pfaffenhofen/Ilm (DE)

(73) Assignee: HECHT TECHNOLOGIE GMBH, Pfaffenhofen/Ilm (DE)

( * ) Notice: Subject to any disclaimer, the term of this patent is extended or adjusted under 35 U.S.C. 154(b) by 9 days.

(21) Appl. No.: 18/440,301

(22) Filed: Feb. 13, 2024

(65) Prior Publication Data
US 2024/0269870 A1   Aug. 15, 2024

(30) Foreign Application Priority Data

Feb. 15, 2023  (DE) .......................... 10 2023 103 706
Apr. 4, 2023   (DE) .......................... 10 2023 108 659

(51) Int. Cl.
*B25J 21/02*     (2006.01)
*B08B 5/04*      (2006.01)
(Continued)

(52) U.S. Cl.
CPC ................. *B25J 21/02* (2013.01); *B08B 5/04* (2013.01); *B65B 1/28* (2013.01); *B65G 69/181* (2013.01); *B67C 9/00* (2013.01)

(58) Field of Classification Search
CPC ... B25J 21/02; B08B 5/04; B65B 1/00; B65B 1/28; B65G 69/18; B65G 69/181; B67C 9/00
See application file for complete search history.

(56) References Cited

U.S. PATENT DOCUMENTS 5,735,321 A * 4/1998 Martyn ................... B65B 69/00
                                                    414/292
7,168,460 B2 * 1/2007 Dietrich ................... B65B 1/16
                                                    414/217
(Continued)

FOREIGN PATENT DOCUMENTS

DE    202011051992 U1    11/2011
DE    102019109648 A1    10/2020
(Continued)

OTHER PUBLICATIONS

Extended European Search Report for European Application No. 24156598.5 dated Jul. 16, 2024.

*Primary Examiner* — Nicolas A Arnett
(74) *Attorney, Agent, or Firm* — Chrisman Gallo Tochtrop LLC

(57) ABSTRACT

An isolator for emptying a container includes a connecting device for connecting the container containing a powder/granular product to the isolator; and a base body defining a connecting opening via which an opening of the container can be introduced at least in sections into an inner space of the base body from an outside environment. A connecting device includes a sealing device arranged at the connecting opening and has an adjustable sealing element. The adjustable sealing element is pressed against an outer wall of the container to produce a sealed state and is released from the outer wall of the container to produce an at least partially open state. A gap is formed between the sealing element and the outer wall of the container that an air flow directed into the inner space of the base body is generated due to the different ambient pressure.

11 Claims, 12 Drawing Sheets

(51) Int. Cl.
 *B65B 1/28* (2006.01)
 *B65G 69/18* (2006.01)
 *B67C 9/00* (2006.01)

(56) References Cited

U.S. PATENT DOCUMENTS

| | | | | |
|---|---|---|---|---|
| 7,381,127 | B2 * | 6/2008 | Price | B08B 15/026 |
| | | | | 141/93 |
| 8,905,090 | B2 * | 12/2014 | Trebbi | B65B 37/00 |
| | | | | 141/319 |
| 2022/0055850 | A1 * | 2/2022 | Dietrich, Jr. | B65G 69/186 |
| 2024/0270522 | A1 * | 8/2024 | Haussmann | B65G 47/72 |

FOREIGN PATENT DOCUMENTS

| | | | | |
|---|---|---|---|---|
| DE | 102019121594 | A1 | 12/2020 | |
| EP | 3750818 | A1 * | 12/2020 | ............... B65B 1/28 |
| EP | 4095051 | A1 | 11/2022 | |
| WO | WO 2020/098940 | * | 5/2020 | ............. B65G 65/23 |

* cited by examiner

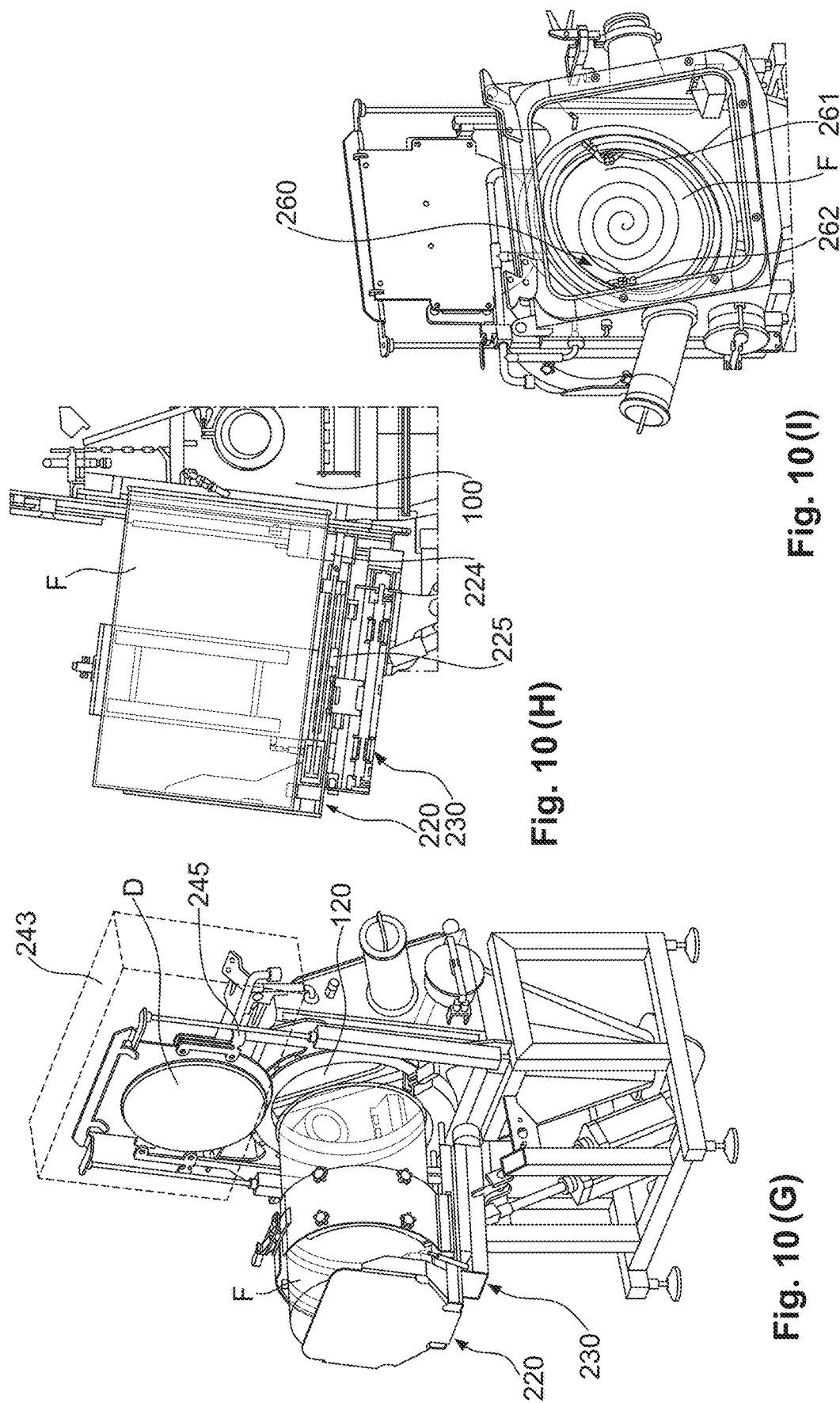

ISOLATOR

This application claims priority to German Application No.: 10 2023 103 705.6, filed Feb. 15, 2023 and German Application No.: 10 2023 108 658.8, filed Apr. 4, 2024, all of which are hereby incorporated by reference.

The present invention relates to an isolator with a connection device for connecting a container containing a powder/granular product.

Connecting devices for connecting containers containing powder/granular products and corresponding isolators are generally known.

With such connecting devices, the containers are usually connected by clamping a tubular outlet of the container or a separate foil tube provided for the connection and attached to the container to the connecting device. The powder/granular product is then transferred via the tubular outlet or the foil tube, i.e. either filled into the container or emptied from it.

After transferring the product, a user ties off the tubular outlet or foil tube twice and then cuts it. The remaining foil on the connecting device must be removed when reconnecting another container. This is done, for example, by means of separate side openings provided for this purpose.

The procedure explained prevents a user from coming into contact with the product or—vice versa—the product from coming into contact with the outside environment, and is therefore particularly suitable for cases in which products that are hazardous to health need to be handled or cross-contamination needs to be prevented.

However, the disadvantage of the approach outlined above is that the handling of the foil tube by the user is complex and takes a considerable amount of time. Furthermore, the measures to be taken in connection with the further handling and disposal of the used foil bags contaminated with the product are associated with considerable effort and high costs.

In addition, the approach still requires the user to be in the direct vicinity of the drum when undocking it. Due to the associated proximity to the drum, the probability of the user coming into contact with the product inside or adhering to it remains high.

Against the above background, it is an object of the present invention to provide a connecting device for connecting a container containing a powder/granular product to a device, such as an isolator, which enables efficient and contamination-free undocking of containers. It is also preferable that the undocking of containers is carried out automated to the greatest extent possible.

However, the preferred core idea of the invention in the present application lies primarily in the provision of an efficient and contamination-free undocking process.

The object of the invention is solved by an isolator according to claim 1. Preferred embodiments of the invention are subject-matters of the dependent claims.

An isolator according to the invention for emptying a container containing a powder/granular product comprises
- a connecting device for connecting a container containing a powder/granular product to the isolator;
- a base body which defines a connecting opening via which an opening of the container can be introduced at least in sections into an inner space of the base body from an outside environment as intended, wherein
- a lower ambient pressure is generated in the inner space of the base body than in the outside environment, and wherein
- the connecting device comprises a sealing device arranged at the connecting opening and having an adjustable sealing element which can be adjusted in such a way that it
  a) is pressed preferably directly against an outer wall of the container to produce a sealed state and closes the inner space from the outside environment, and
  b) is released from the outer wall of the container to produce an at least partially open state in such a way that a gap is formed between the sealing element and the outer wall of the container, wherein
- the gap is formed in such a way that an air flow directed into the inner space of the base body is generated due to the different ambient pressure.

Isolators are preferably designed to handle substances that are toxic or hazardous to health. Such isolators preferably have glove ports on a front side of the base body made of metal and/or plastic, via which a user can carry out certain activities in the inner space of the isolator without coming into direct contact with the substances being handled.

Directly means that the adjustable sealing element is in contact with the wall of the container itself, in particular without an intervening foil layer.

The said container is preferably a drum filled with the product.

The connecting opening is preferably formed on the rear side of the base body, into which the container is inserted for emptying as intended. Furthermore, a diameter of the connecting opening is preferably larger than a diameter of the outer wall of the drum at its opening.

The sealing device is preferably configured to close the gap formed by the different diameters of the connecting opening and the outer wall of the drum by adjusting the adjustable sealing element. In this respect, the adjustable sealing element is preferably arranged between the connecting opening and the outer wall of the drum.

A gap distance between the adjustable sealing element and the outer wall of the drum is preferably in a range between 0.1 mm and 1 mm in the at least partially open state.

Preferably, a flow velocity of the directed air flow can be adjusted based on the gap distance. The smaller the gap distance, the higher the flow velocity of the directed airflow.

The directed air flow is preferably generated in such a way that it is formed along a longitudinal axis of the drum, running around the outer wall of the drum.

The at least partially open state is preferably initiated when the container/drum is removed/docked.

Due to the directed air flow into the inner space of the base body, emerging of product is prevented, especially during undocking of the container/drum. In addition, the air flow can cause product adhering to the adjustable sealing element to be released and sucked into the inner space of the base body. The directed airflow therefore reduces the likelihood of product reaching the outside environment and thus coming into contact with a user. Furthermore, the use of the foil tube described above and the associated handling can be dispensed with.

The lower ambient pressure generated in the inner space of the base body is preferably achieved by suction. Suction is preferably carried out by means of a vacuum pump connected to the inner space, via which air is constantly sucked off from the inner space. A pumping capacity or a quantity of air that is removed or sucked off from the inner space is preferably kept constant. This also applies in particular during the establishment of the (at least partially) open state. Although this has the effect that the negative pressure prevailing in the inner space decreases during opening compared to the sealed state, a constant or homogeneous directed air flow can be generated or ensured in this way. In other words, the directed air flow is preferably generated solely by the formation of the gap. If, on the other hand, the pumping capacity is increased during opening in order to generate a directed air flow, turbulence or swirling can occur in the area of the gap between the adjustable sealing element and the outer wall of the drum. In particular, an increase in pump performance during opening can also lead to a brief expulsion of air from the inner space-a so-called "coughing out". These effects are undesirable, as they may allow product to reach the outside environment.

Preferably, the adjustable sealing element is an inflatable seal formed from a resilient material running radially around the connecting opening.

Preferably, the adjustable sealing element/the inflatable seal is formed to the connecting opening in such a way that it protrudes into the inner space of the base body.

Preferably, the inflatable seal can be essentially L-shaped. In this way, the rim/edge at the opening of the container/drum can preferably be pressed/covered by the inflatable seal in addition to the outer wall.

Preferably, the sealing device further comprises an adjustment device being configured to adjust an air supply, under which the inflatable seal expands, and an air withdrawal, under which the inflatable seal relaxes, wherein the adjustment device adjusts the air supply to produce the sealed state in such a way that the inflatable seal is pressed circumferentially against an outer wall of the container, and starting from the sealed state, the adjustment device adjusts the air extraction to produce the at least partially open state in such a way that the inflatable seal detaches at least in sections from the outer wall of the container and forms the gap.

The adjustment device can preferably be controlled via the control device. In this way, the sealed state and the partially open state can be created automatically or integrated into an automated connection/docking process.

The adjustment device preferably has an adjustment means via which an air pressure within the inflatable seal can be adjusted. One example of a suitable adjustment device is a needle valve, which can be used to precisely adjust the air pressure within the inflatable seal.

Preferably, to produce the at least partially open state, the inflatable seal detaches at least in sections from the outer wall of the container due to a force acting on the inflatable seal as a result of the difference between the ambient pressure in the inner space of the base body and in the outside environment.

Preferably, in the sealed state, the difference between the ambient pressure in the inner space of the base body and the outside environment is 0.5 bar.

In addition to the gap distance, the flow velocity of the directed air flow is preferably adjustable as a function of the pressure difference between the ambient pressure in the outside environment and the lower ambient pressure present in the inner space of the base body. Preferably, the isolator is configured to reduce the ambient pressure in the inner space of the base body to a negative pressure in the range of −10 mbar to −100 mbar when sealed.

The isolator preferably fulfills the requirements of OEB/OEL level 3 or 4 according to ADE (Acceptable Daily Exposure).

Preferably, a time interval for establishing the at least partially open state is 10, 15, 20 or, 25 seconds.

The gap distance is preferably kept as small as possible during this time interval in order to be able to maintain a constant directed air flow for a correspondingly long time.

Preferably, a blow-off device is provided in a region of the connecting opening, which is arranged tangentially with respect to an inner wall of the container and is configured up to blow off the inner wall of the container before the at least partially open state is established in such a way that powder/granular product adhering to the inner wall is detached and sucked off.

The blow-off device preferably comprises one or a plurality of compressed air nozzles, wherein the one or the plurality of compressed air nozzles is preferably oriented substantially tangentially with respect to the inner wall of the drum F. The tips of the compressed air nozzles are preferably aligned towards the bottom of the container/drum.

The blow-off device can preferably blow off the inner wall of the container/barrel by ejecting one or a plurality of blasts of air, preferably after the container/drum has been emptied. In this way, product adhering to the inner wall can preferably be detached from the wall and sucked off or transported towards the bottom of the container/drum.

Preferably, the one or more air blasts generate a spiral air flow along the inner wall of the container/drum in the direction of a base of the container/drum. Preferably, particles adhering in particular in the area of the opening of the container/drum can be efficiently loosened in this way or collected at the bottom of the container/drum. This reduces the likelihood of product adhering to the inner wall getting into the outside environment or coming into contact with the user.

Further preferred features of the Isolator are described in the context of the embodiment.

Below, preferred embodiments are explained with reference to the attached figures.

Figure 4A:
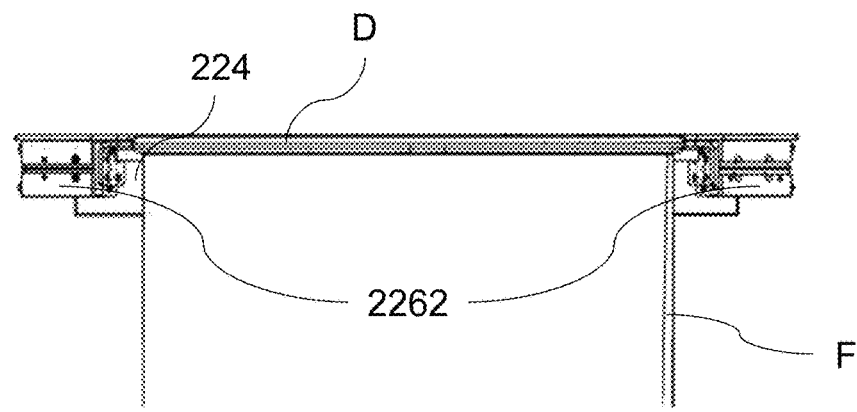
Figure 4B:
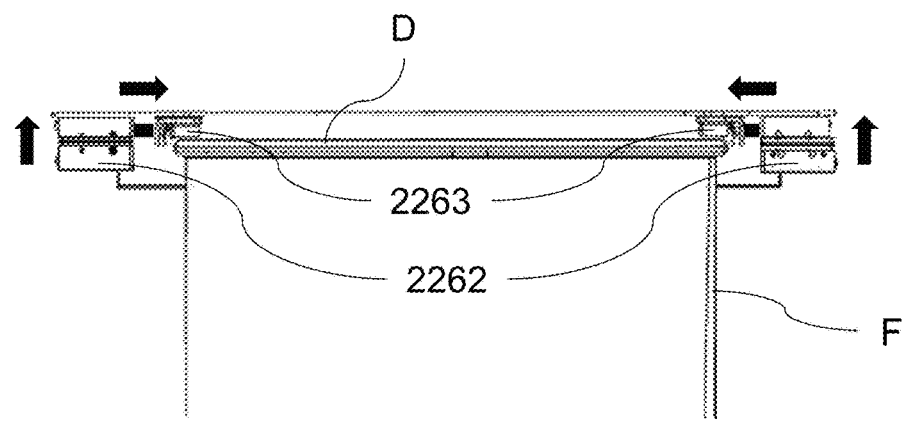
Figure 4C:
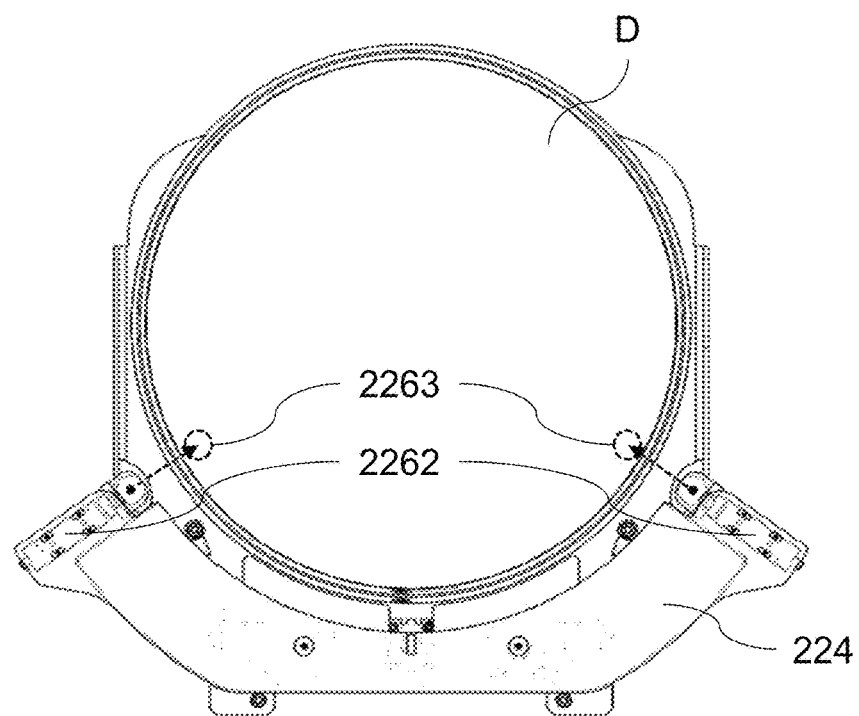

FIGS. 4 A to C illustrate the structure and mode of operation of a fixing device according to an embodiment of the invention.

Figure 5A:
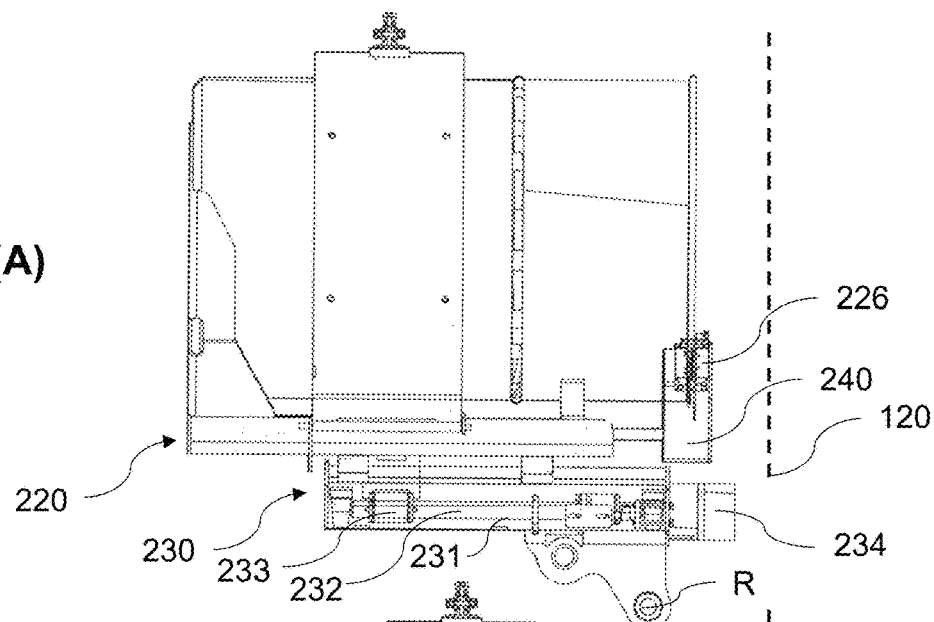
Figure 5B:
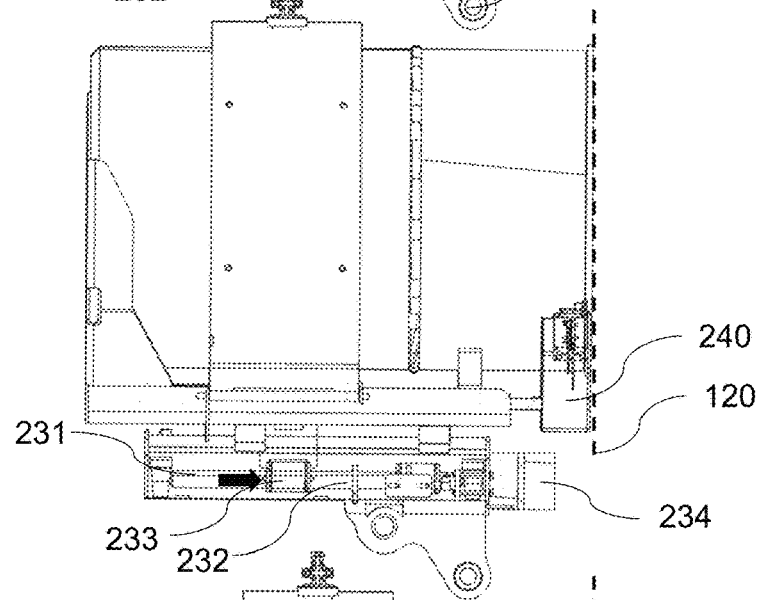
Figure 5C:
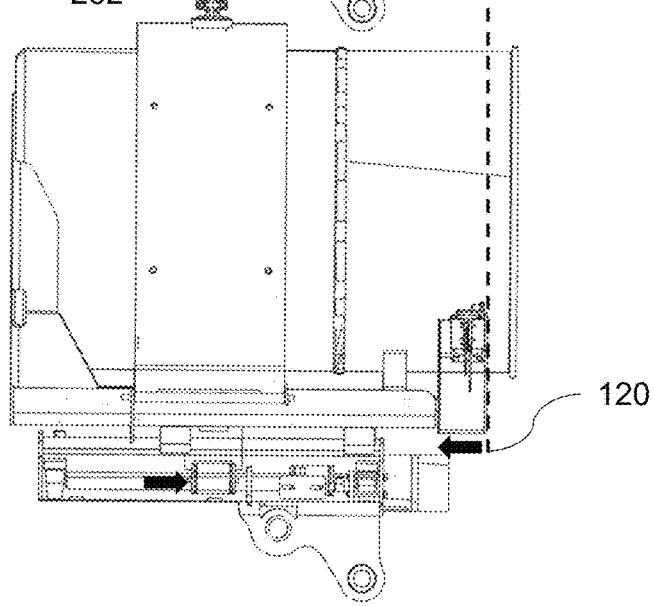

FIGS. 5 A to C show states which can be achieved by the interaction of a container transfer device and a holding device according to an embodiment of the invention.

Figure 6A:
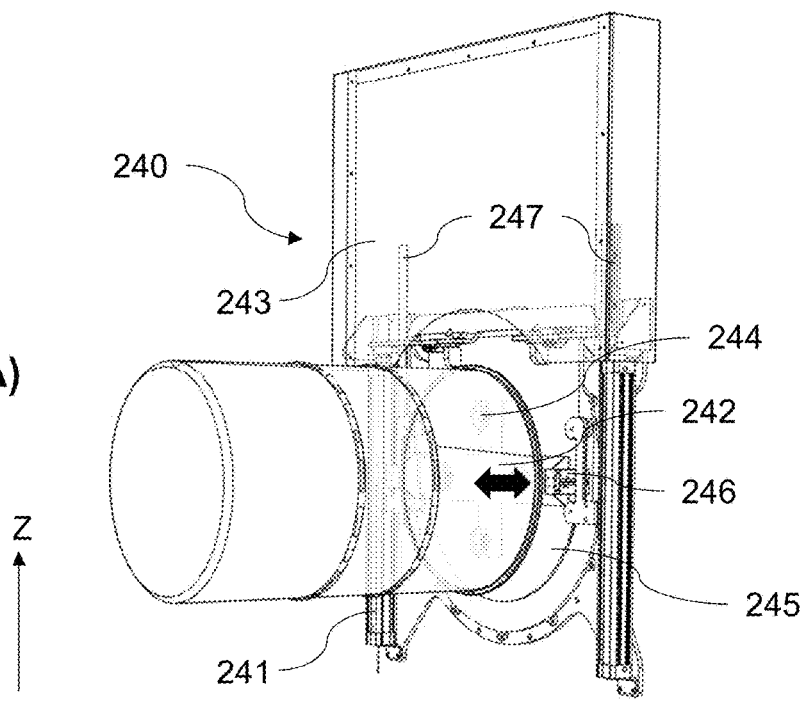
Figure 6:
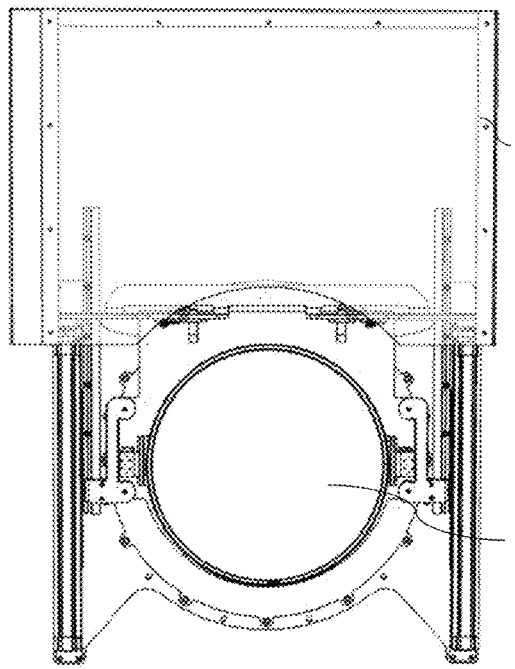

FIGS. 6 A to C illustrate the structure and mode of operation of a lid displacement device according to an embodiment of the invention.

Figure 7A:
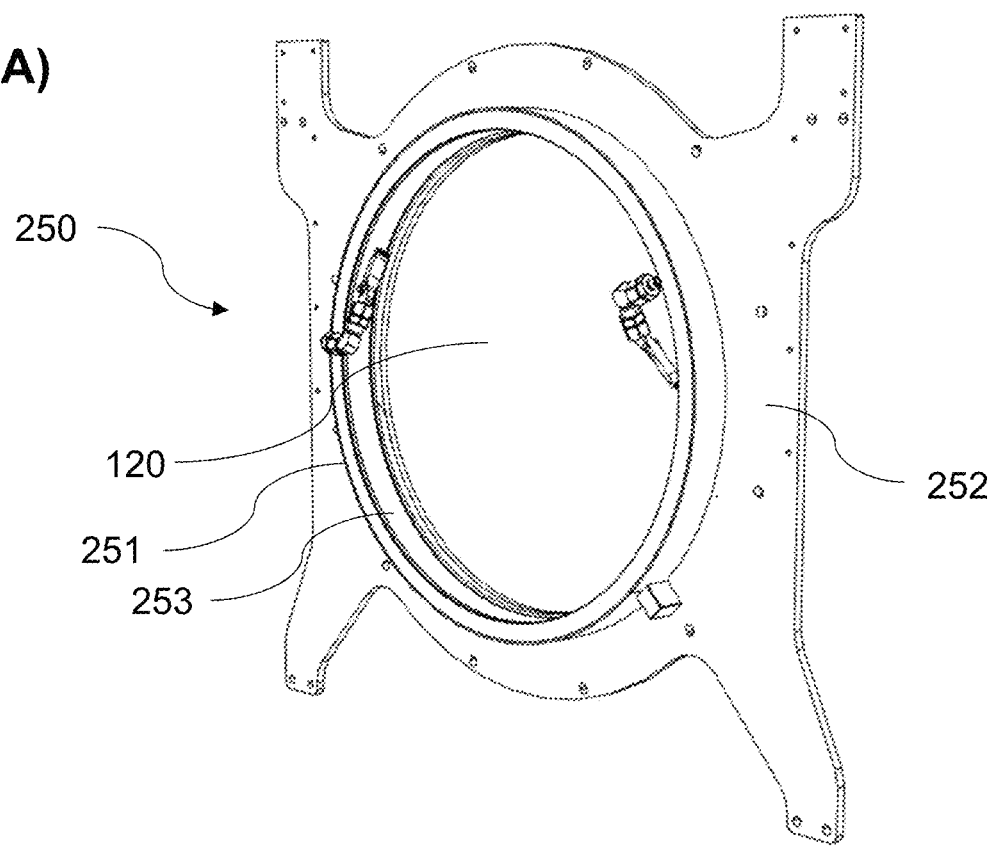
Figure 7B:
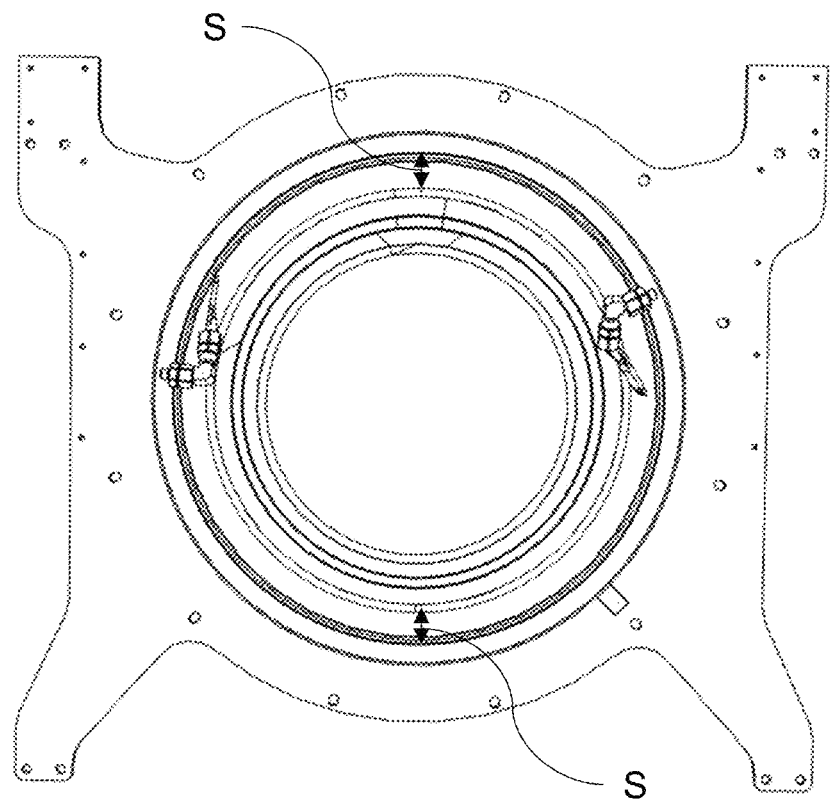
Figure 8A:
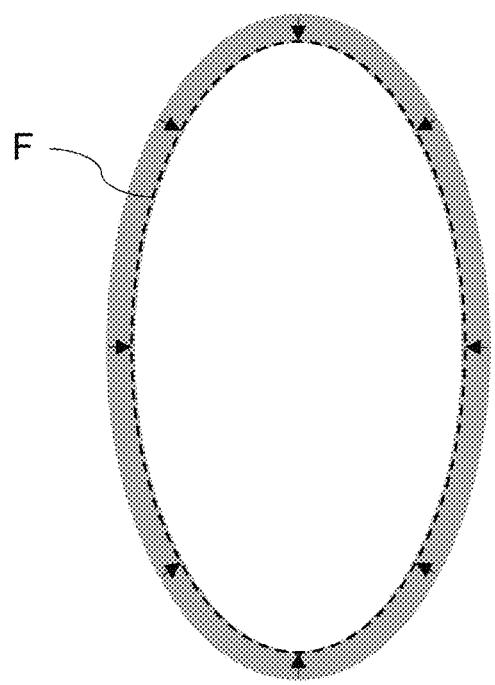
Figure 8B:
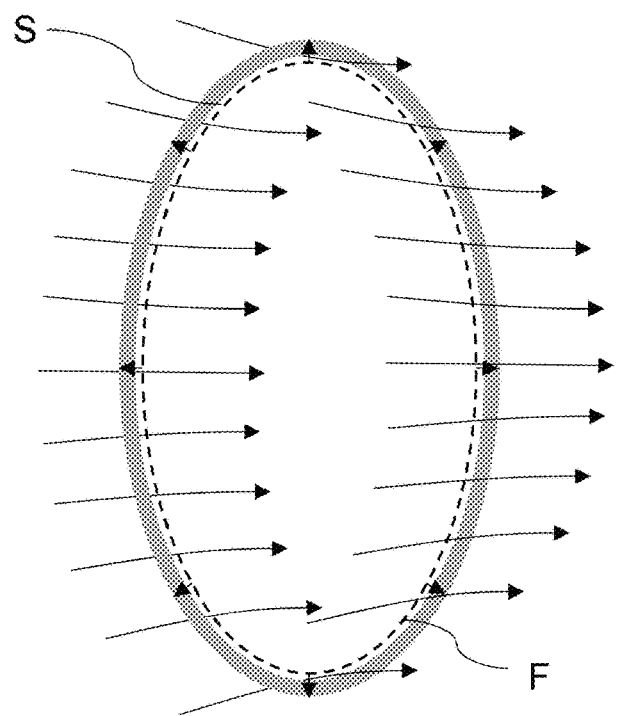
Figure 8C:
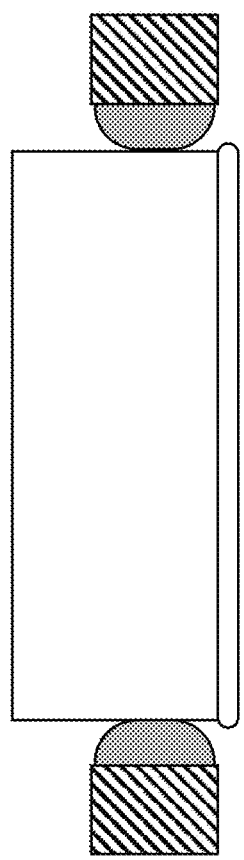
Figure 8D:
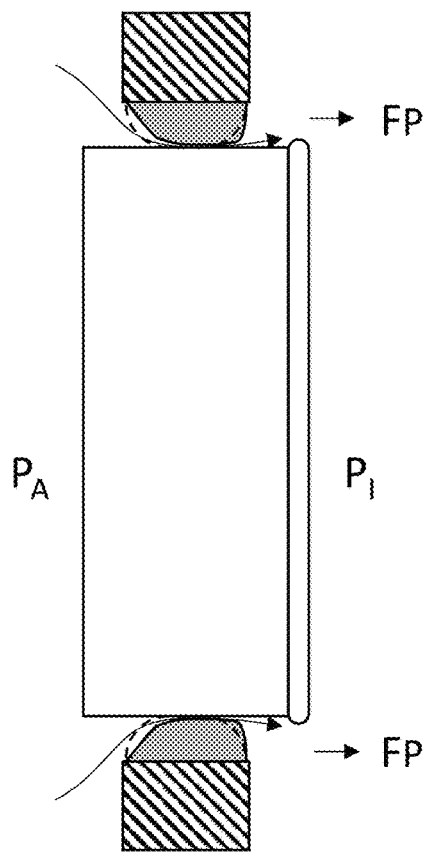
Figure 8E:
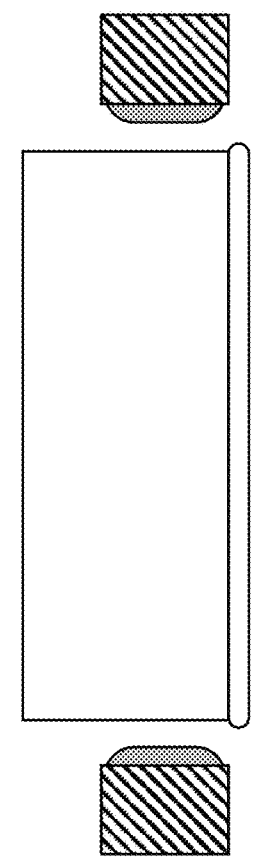

FIGS. 7 A and B illustrate the structure and operation of a sealing device according to an embodiment of the invention.

FIGS. 8 A to E illustrate the structure and mode of operation of a sealing device according to the embodiment of the invention.

Figure 9:
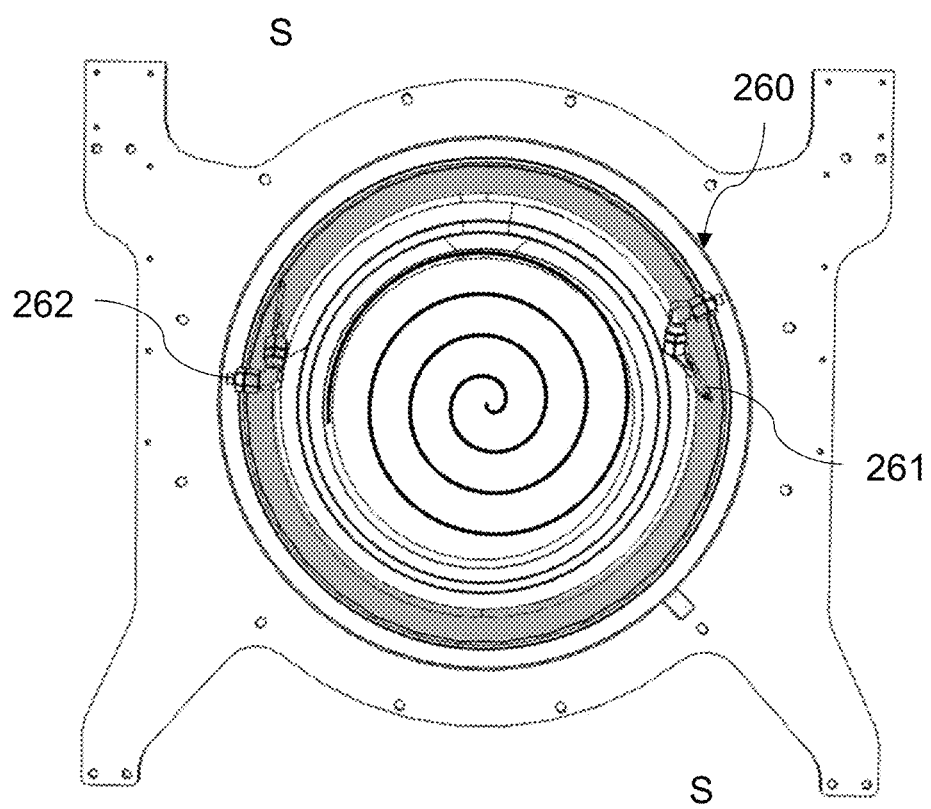
Figure 10A:
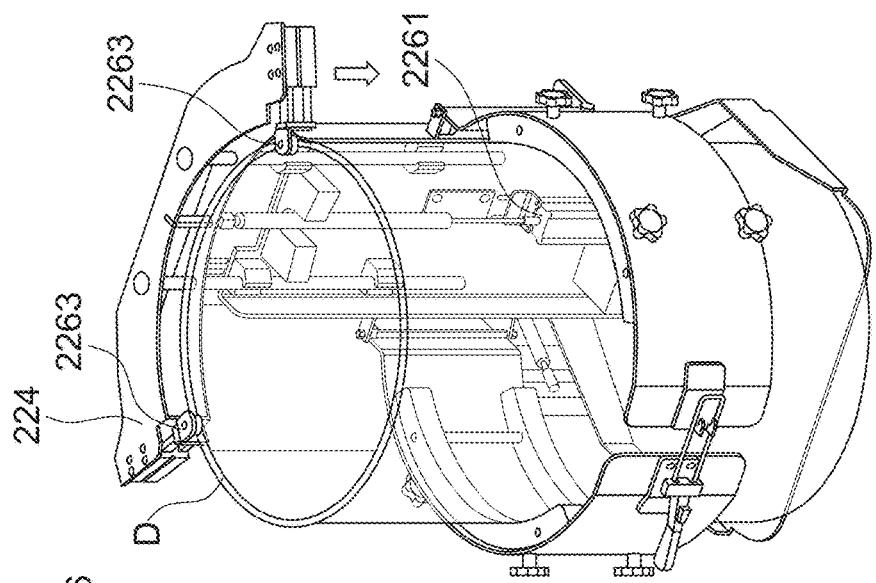
Figure 10B:
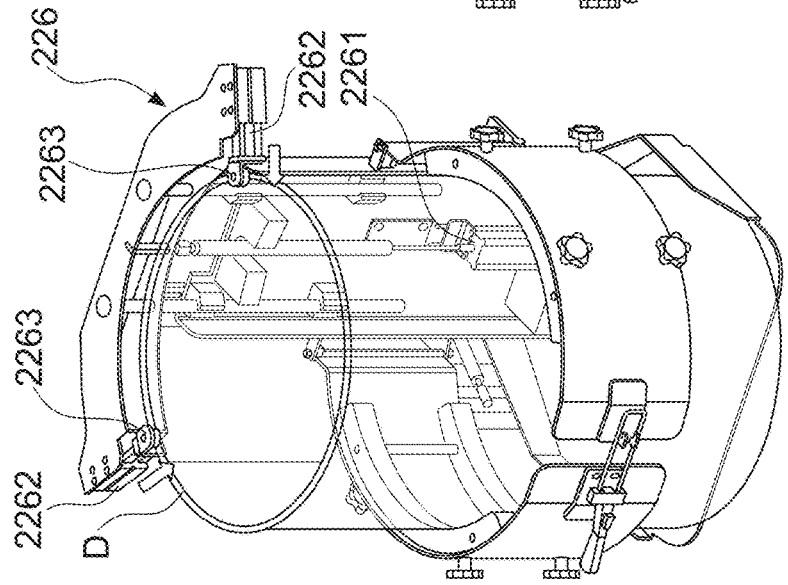
Figure 10C:
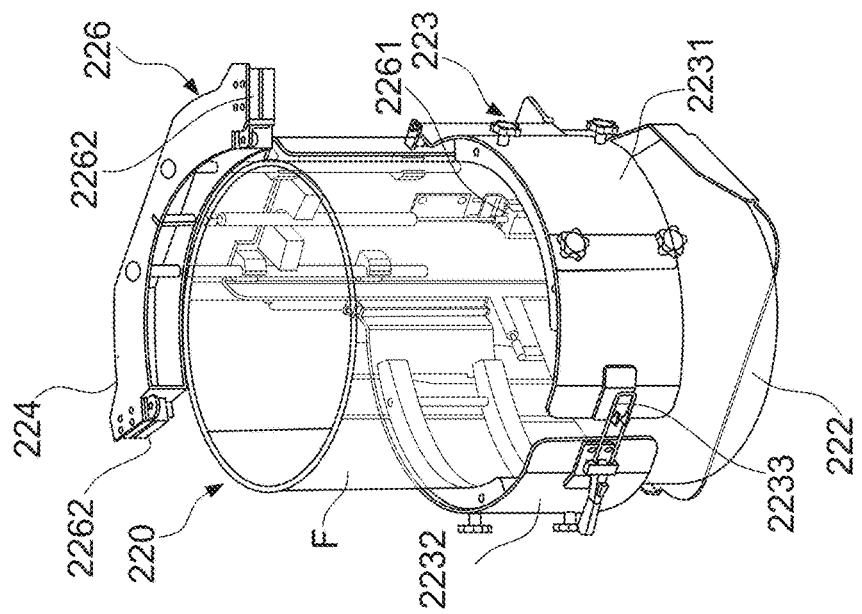
Figure 10F:
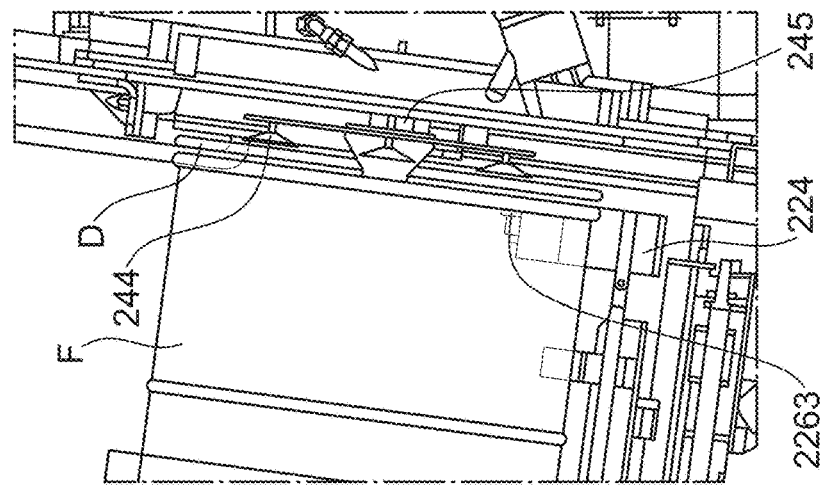
Figure 10E:
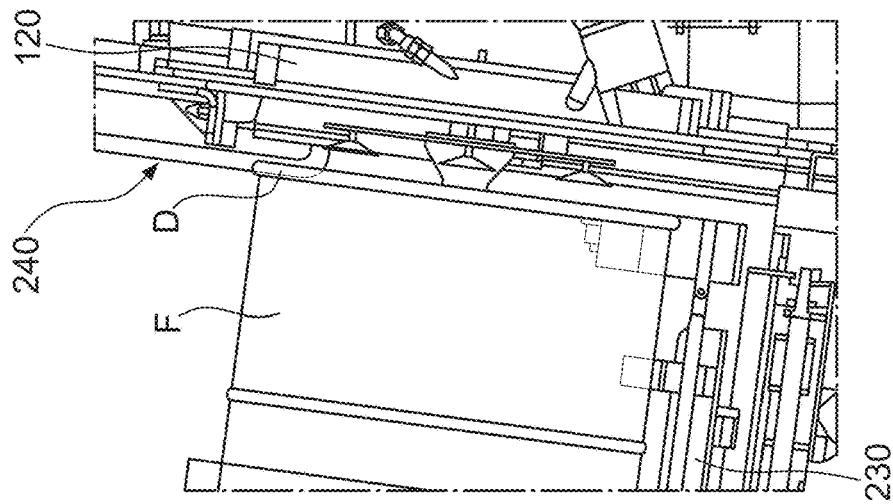
Figure 10D:
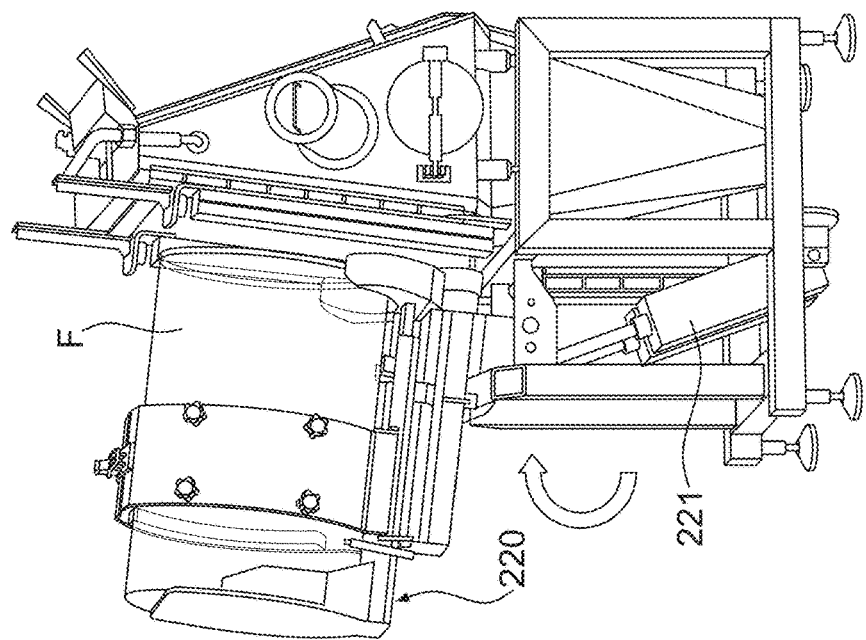

FIG. 9 illustrates the structure and mode operation of a blow-off device according to an embodiment of the invention.

FIGS. 10 A to I show a method for connecting/docking the drum to/from the isolator according to the invention using the preferred connecting device.

Figure 1:
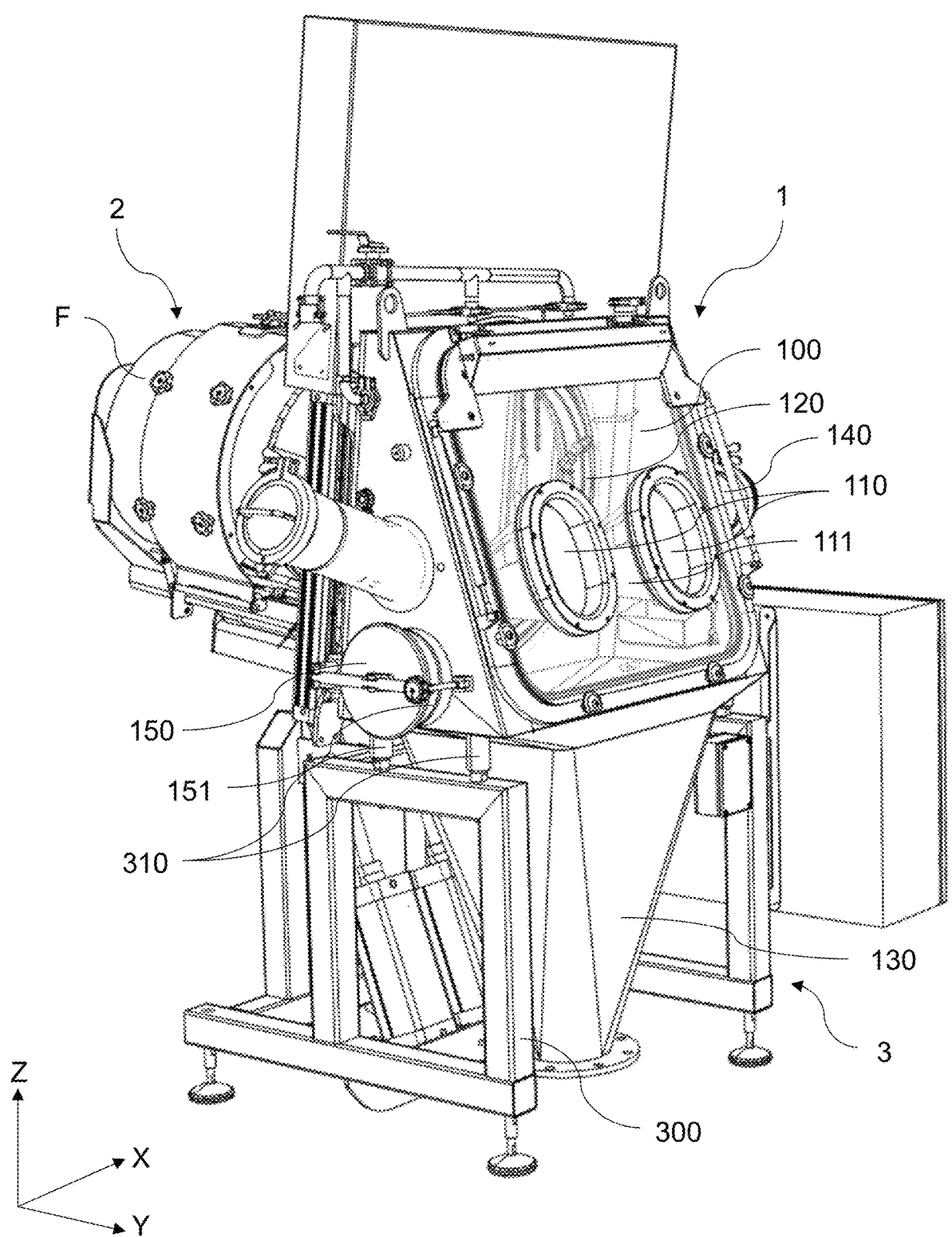
FIG. 1 shows a perspective view of an isolator according to the invention with a preferred connecting device.

FIG. 1 shows a perspective view of an isolator 1 according to the invention with a preferred connecting device 2.

The Z-direction shown in FIG. 1 corresponds to a height direction of the isolator 1, wherein a height h of the isolator 1 is preferably in a range from 220 cm to 260 cm, preferably 250 cm; the X-direction shown in FIG. 1 corresponds to the width direction of the isolator 1, wherein a width b of the isolator 1 is preferably in a range from 140 cm to 180 cm, preferably 160 cm; and the Y-direction shown in FIG. 1 corresponds to the depth direction of the isolator 1, wherein a depth t of the isolator 1 is preferably in a range between 120 cm to 160 cm, preferably 140 cm.

The isolator 1 has an essentially cuboid base body 100. The base body 100 preferably comprises two ports 110 in the base body 100 on a front side, via which the user can carry out certain activities in an inner space of the base body 100 without there being a risk of contamination of the product or the user. In the embodiment shown, the ports 110 are designed as gloves. The gloves are preferably connected to the base body 100 in such a way that the user can insert the entire arm into the gloves and thus reach into the inner space of the base body 100 in order to reach a desired area. Preferably, the base body 100 also has a viewing window 111 on the front side so that the user can observe his activities in the inner space.

A connecting opening 120 is formed on a rear side of the base body 100 opposite the front side. The connecting opening 120 is preferably used to insert a container F into the inner space of the base body 100 as intended. The container F is preferably a drum F, which contains, for example, powder and/or granular product. Preferably, this product may present a potential hazard to the user and the environment if released. Alternatively, it may preferably be necessary for the product itself to have a certain degree of purity for further processing. For the reasons mentioned above, it is therefore preferable that the product is feeded to/removed from the drum F without contamination. The drum F preferably comprises a lid D, which can be attached to an opening of the drum F via a clamp. In addition, an adhesive seal can be provided between the drum F and the lid D. In addition, the powder and/or granular product can be enclosed further in a sealed foil bag inside the drum F.

A substantially tubular, downwardly tapered product guide 130 is preferably provided on a lower side of the base body 100, via which the isolator 1 is connected to a production system not shown. In this way, the powder/granular product can be fed into the production system for further processing after removal from the drum F inside the isolator 1.

Furthermore, a pump connection 140 is provided on the base body 100 on a right-hand side (in FIG. 1 the side facing away with respect to the width direction X). Air/atmosphere can be removed from the inner space of the base body 100 via this, so that a lower ambient pressure is generated in the inner space of the base body 100 than in the outside environment of the isolator 1. Preferably, the ambient pressure inside the inner space is reduced to a negative pressure in the range of −10 mbar to −100 mbar compared to the ambient pressure in the outside environment. Preferably, a vacuum pump, not shown, is connected to the pump connection, via which air is sucked off from the inner space of the base body 100. Furthermore, a HEPA filter (High Efficiency Particulate Airfilter) is preferably provided at the pump connection 140, via which sucked off air is filtered. This ensures that powder and/or granular product that is released into the inner space of the base body 100 during handling/emptying of the drum F is sucked off and does not reach the outside environment. Preferably, the base body 100 is also provided with an air supply, not shown, connected to the inner space. The air supply is preferably configured to preferably supply filtered fresh air to the inner space of the base body 100. Preferably, the air supply is furthermore spaced from the pump connection 140, so that a preferably continuous air flow can be generated within the inner space of the base body 100 in the interaction of the air supply and the pump connection 140.

A waste portion 150 is preferably formed on a left-hand side of the base body (in FIG. 1, the side facing towards with respect to the width direction X). The waste portion 150 preferably forms a passageway and is on the one hand connected to the inner space of the base body 100 and on the other hand has an opening with a fastening mechanism 151. It is preferably possible to attach a waste container not shown in FIG. 1 to the fastening mechanism. The waste container is preferably a flexible waste bag, which is clamped by means of the fastening mechanism 151. After emptying the foil bag containing the powdery and/or granular product inside the drum F, the user can thus preferably remove the emptied foil bag via the waste portion 150.

Preferably, the isolator 1 having a rack 3 is placed at a desired location. In the embodiment shown in FIG. 1, the rack 3 is essentially formed by a frame 300 made of hollow profiles of mild steel or stainless steel. The frame 300 preferably comprises fastening devices 310, to which the base body 100 can be fastened to the frame 300 via fastening means.

Figure 2:
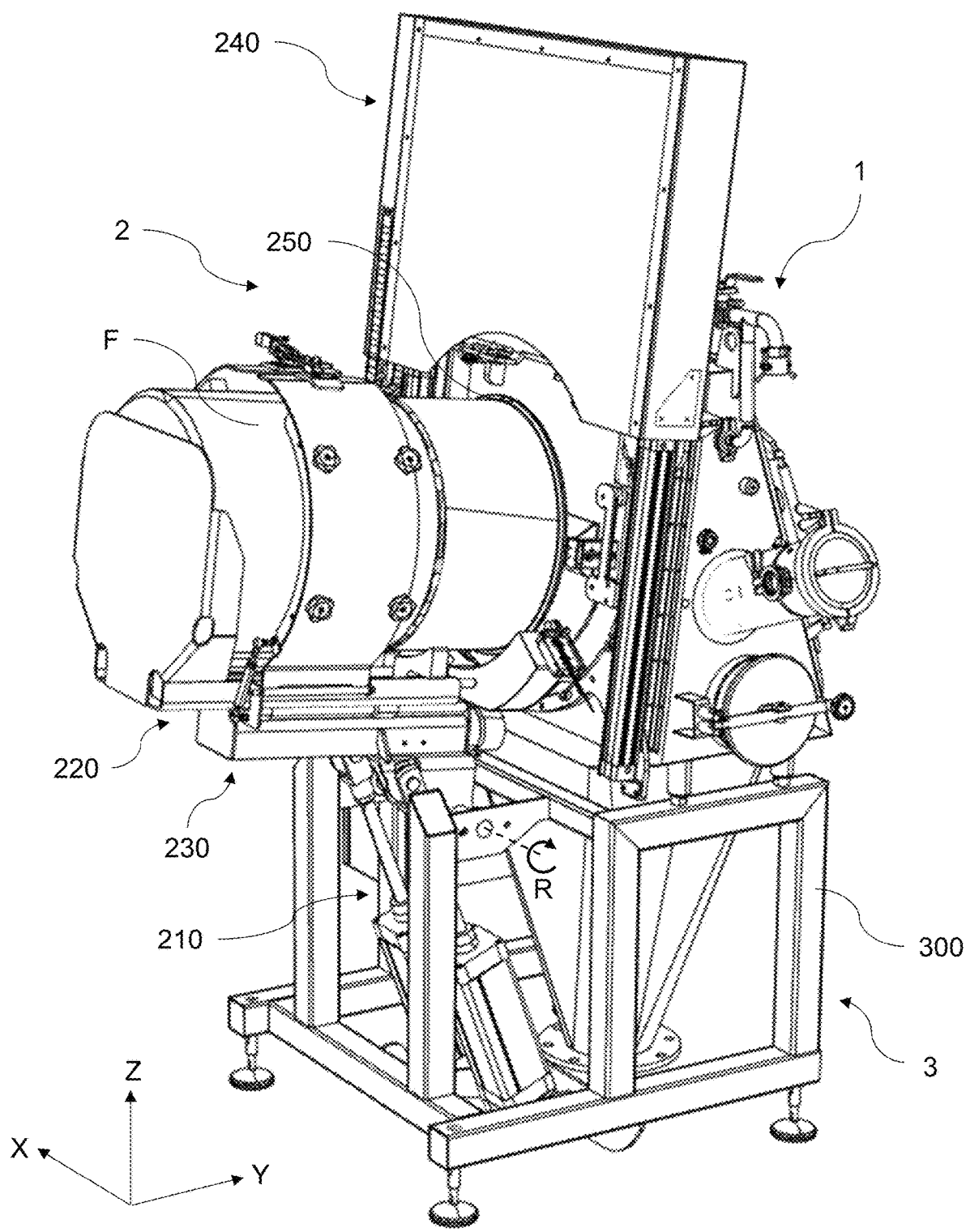
FIG. 2 shows a further perspective view of the isolator according to the invention with the preferred connecting device.

FIG. 2 shows a further perspective view of the isolator 1 according to the invention with the preferred connecting device 2.

The design of this connecting device 2 will be explained in detail in the following description. The connecting device 2 shown in FIG. 2 preferably comprises a lifting device 210, a holding device 220, a container transfer device 230, a lid displacement device 240, a sealing device 250 and a non-visible blow-off device 260. In particular, the lifting device 210, the holding device 220, the container transfer device 230 and the lid displacement device 240 are preferred features in the context of the present application, which are used for the automated feeding/docking of containers. In an alternative embodiment, the corresponding feeding/undocking can also be carried out manually by the user. The sealing device 250 and the blow-off device 260, on the other hand, are particularly advantageous in connection with an efficient and contamination-free undocking process, so that these features reflect the core of the present application.

In the embodiment shown, the preferred lifting device 210 is preferably formed by two pneumatic cylinders 211 and 212. The pneumatic cylinders 211 and 212 can be controlled via a control device not shown. The lifting device 210 is not limited to the number of two pneumatic cylinders. Alternatively, several, for example three or four, pneumatic cylinders or just one pneumatic cylinder can be provided.

A first end of each of the pneumatic cylinders 211 and 212 is preferably rotatable attached to the frame 300 of the rack 3 via fastening means. The other end is preferably also connected to the container transfer device 230 in a rotatable manner. The container transfer device 230 is itself also rotatably mounted to the frame 300. The corresponding axis of rotation R of the container displacement device 230 is highlighted in FIG. 3 by means of a dashed line.

The preferred container transfer device 230 is further connected to the holding device 220. The features and functions of the container transfer device 230 will be explained in detail later in the description.

By controlling the pneumatic cylinders 211 and 212 via the control device, the container transfer device 230 and the holding device 220 can preferably be adjusted or displaced between an initial holding position, in which the drum F, preferably in an upright position, is received in the holding device 220 as intended, and a tilted position, in which the drum F is displaced/tilted in such a way that the opening of the drum F faces the connecting opening 120 of the isolator 1. FIG. 2 illustrates the tilted position.

Figure 3:
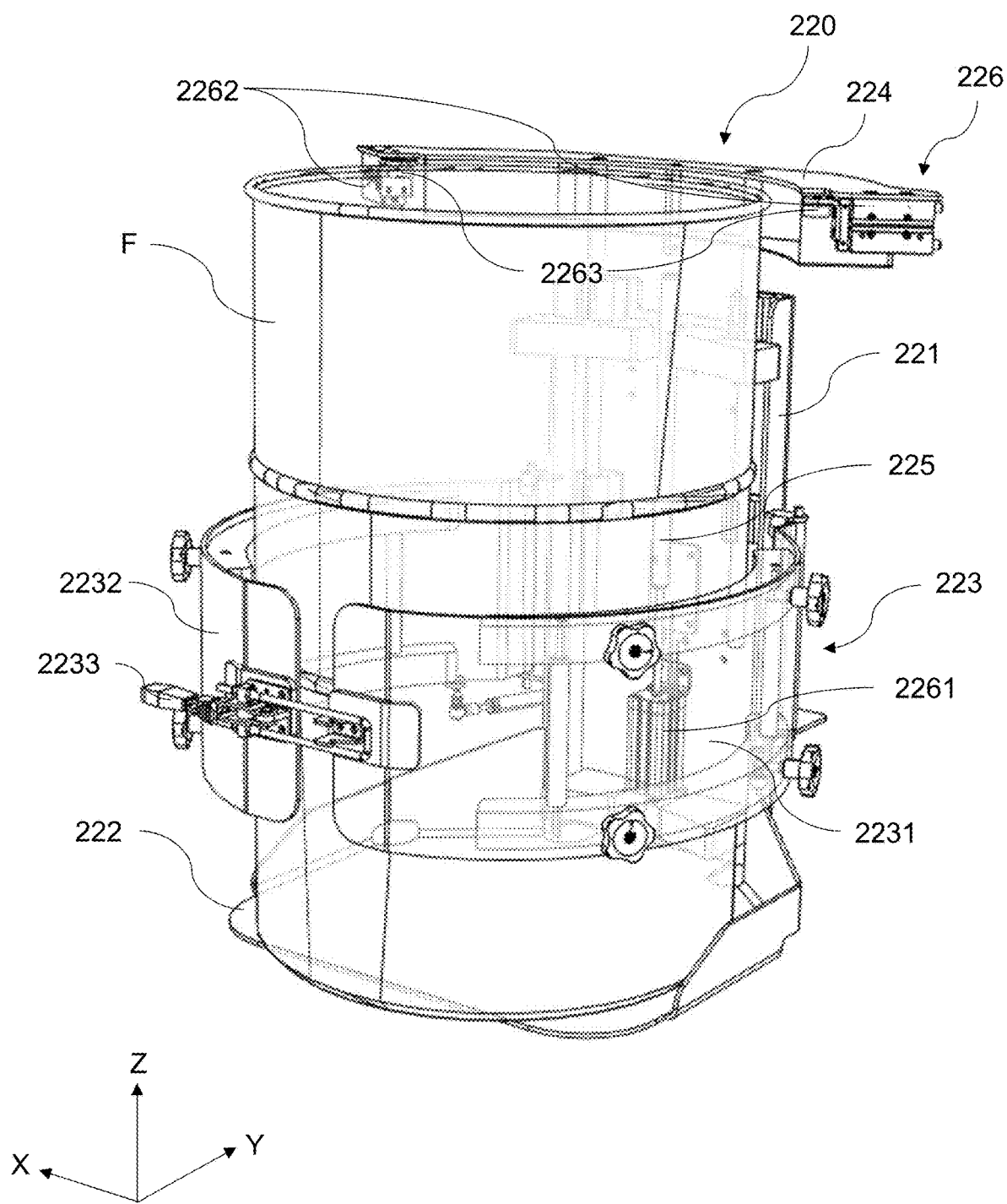
FIG. 3 shows a schematic view of a holding device according to an embodiment of the invention.

FIG. 3 shows a schematic view of the isolated holding device 220 in the initial holding position with the received drum F. The holding device 220 is configured to receive the drum F and to hold it during connecting/docking to/from the connecting opening 120 of the base body 100 of the isolator 1 and the transfer/emptying of the powder and/or granular product into the inner space of the base body 100.

In the embodiment shown, the holding device 220 comprises a base 221 which extends along the longitudinal axis of the drum F to be received.

To hold the drum F in the holding device 220, a receiving plate 222 and a drum clamp 223 are preferably provided on the base 221. The receiving plate 222 is preferably arranged at a distal end of the base 221 with respect to the base body 100 of the insulator 1. In the initial holding position shown, the receiving plate 222 is preferably aligned substantially parallel to the floor on which the rack 3 is standing, or rests on the same floor. The drum F can thus be placed in an upright position with the drum base on the receiving plate 222. The drum clamp 223 preferably comprises a first wing 2231 and a second wing 2232, wherein the first wing 2231 is shown facing the viewer in FIG. 3 and is shown transparent to better illustrate the structural design of the holding device 220. The wings 2231 and 2232 are preferably each rotatably mounted on the base 221 and can be pivoted/spread out to receive the drum F in the holding device 220 in such a way that the drum F can be placed/slid onto the receiving plate 222. The wings 2231 and 2232 can then be swung back so that they rest against an outer wall of the drum F. In this position, the wings 2231 and 2232 can then be tensioned via a tensioning lever 2233, preferably in such a way that the drum F is fixed within the holding device 220.

Furthermore, the holding device 220 preferably comprises a suction device 224. The suction device 240 is preferably arranged at a proximal end of the base 221 with respect to the base body 100 of the isolator 1. The suction device 224 is preferably provided to suck off powder/granular product which emerges from the drum F while it is held in the holding device 220. In this respect, a pump connection, not shown, is preferably provided on the suction device 224, which is also connected to a vacuum pump. Preferably, the suction device 224 can be operated via the same vacuum pump which was mentioned in connection with the suction at the pump connection 140 in the base body 100 of the isolator 1.

Preferably, the suction device 224 is arranged in an area around the opening/upper edge of the drum F. In the specific case shown, the suction device 224 is formed by a housing which has a suction opening facing the outer wall of the drum F. Furthermore, the housing of the suction device 224 is preferably essentially sickle-shaped or crescent-shaped, so that the suction opening follows the contour of the wall of the drum F, at least in sections. In addition, the suction device 224 is preferably arranged in relation to a longitudinal axis of the drum F in such a way that, in the tilted position of the holding device 220, the suction opening is arranged below the drum F in the Z-direction. In this way, a probability is increased that powder emerging from the drum F can be sucked off by the suction device 224.

Furthermore, the suction device 224 is preferably movably mounted with respect to the remaining holding device 220. In this respect, guides are preferably provided on the holding device 220 which extend along the longitudinal axis of the drum F held and enable movement of the suction device 224 in the direction of the longitudinal axis of the drum F. Preferably, a damping element 225 is also provided on the suction device 224, which will be discussed in more detail later.

Furthermore, the holding device 220 preferably comprises a fixing device 226. The fixing device 226 is preferably provided in order to fix the lid D of the drum F to the drum F during moving/tilting. In the specific case shown, the fixing device 226 comprises a drive unit 2261 and a fixing unit 2262. Preferably, the drive unit 2261 can be controlled via the control device in such a way that the fixing unit 2262 can be moved in the direction of the longitudinal axis/in the Z-direction.

In the embodiment shown, the fixing unit 2262 is preferably arranged on the suction device 224 and can be moved in the longitudinal direction together with the suction device 224 via the drive unit 2261. The coupling of the suction device 224 and the drive unit 2261 is preferably formed by the damping element 225. Furthermore, the fixing unit 2262 preferably comprises two guide cylinders which are arranged radially with respect to the edge of the drum F and can be extended in a radial direction towards the longitudinal axis of the drum F. The guide cylinders are preferably also controllable via the aforementioned control device. In addition, a fixing element 2263 is preferably provided at each of the extendable ends of the guide cylinders.

FIGS. 4 A to C illustrate the structure and mode of operation of the preferred fixing device 226 in the present embodiment.

FIG. 4 A shows an initial state in which the drum F is received in the holding device 220 and fixed by the drum clamp 223.

To fix the cover D in place, the control unit first controls the drive unit 2261. Subsequently, the suction unit 224 is moved or lifted together with the fixing unit 2262 upwards along the longitudinal axis of the drum F in the direction toward the lid D. This process is illustrated in FIG. 4 B by the vertical arrows pointing upwards. In a lifted state achieved in this way, the fixing elements 2263 are arranged above the lid D. The control device then controls the guide cylinders of the fixing unit 2262 so that they are extended in the radial direction toward the longitudinal axis of the drum F. This process is illustrated by the horizontal arrows pointing to the center in FIG. 4 B. During movement, the fixing elements 2263 exceed the edge of the drum F and thus cover the surface of the lid D, as illustrated in FIG. 4 C by the dashed circles. Finally, the control device again controls the drive unit 2261 in order to move or lower the fixing unit 2262 along the longitudinal axis of the drum F in the direction toward the drum base. The fixing elements 2263 are pressed onto the lid D so that it is fixed to the drum F.

As explained above, the holding device 220 is connected to the container transfer device 230. FIGS. 5 A to C show states which can be achieved by the interaction of the container transfer device 230 and the holding device 220.

The preferred container transfer device 230 preferably comprises a linear drive 231. The linear drive 231 is preferably configured to move/displace the holding device 220 along the longitudinal axis of the drum F. Preferably, the linear drive 231 is also controlled via the control device. In the specific case shown, the linear drive 231 comprises a spindle 232 arranged along the longitudinal axis of the drum F, a carriage 233 movable on the spindle 232 and a motor 234 connected to the spindle 232. The motor 234 is preferably formed by a compressed air motor, which can be driven by a compressed air supply provided. The carriage 233 is preferably attached to the base 221 of the holding device 220 and thus provides the connection between the container transfer device 230 and the holding device 220.

When the linear drive 231 is controlled by the control device, a torque is preferably applied to the spindle 232 via the motor 234 so that it rotates. The spindle 232 preferably has a thread, which transmits the torque to the carriage 233 and converts it into a movement along the longitudinal axis of the drum F.

FIG. 5 A shows the holding device 220 in the tilted position. Starting from this position, the drum F held in the holding device 220 can be moved in the direction toward the connecting opening 120 of the isolator 1 by actuating the linear drive 231 of the container transfer device 230.

FIG. 5 B shows a state which can be present after transfer of the holding device 220 by the container transfer device 230 in the direction toward the connecting opening 120 of the isolator 1. In the specific case shown, the holding device 220 has been moved so far that the edge of the drum F is adjacent to the connecting opening 120. In the case shown, the housing of the suction device 224 strikes against an outer wall of the base body 100 of the isolator 1 surrounding the connecting opening 120.

If the container transfer device 230 continues to move/displace the holding device 220 in the direction toward the connecting opening 120, the state shown in FIG. 5 C is achieved. The drum F has been moved so far that at least the opening of the drum F is inserted through the connecting opening 120 into the inner space of the base body 100 of the isolator 1. This position represents the emptying position in which the powder/granular product is removed/emptied into the inner space of the base body 100 for emptying the drum F as intended.

When the holding device 220 is moved from the state shown in FIG. 5 B to the state shown in FIG. 5 C, the suction device 224 strikes against the outer wall can execute a relative movement with respect to the holding device 220 due to the movable support with respect to the holding device 220. The relative movement of the suction device 224 preferably takes place in a direction opposite to the displacement movement of the holding device 220. Preferably, the aforementioned damping element 225 is compressed in the course of the relative movement. Due to the mechanism described above, the suction device 224 can be removed from the area around the opening of the drum F when the opening of the drum F is inserted. The fixing elements 2263 of the fixing device 226 are preferably retracted before the relative movement begins.

By allowing the holding device 220 to be moved/displaced along the longitudinal axis of the drum F, the holding device 220 can occupy a plurality of intermediate positions along the movement/displacement path provided by the container transfer device 230.

Furthermore, the preferred connecting device 2 preferably comprises the lid displacement device 240. FIGS. 6 A to C illustrate the structure and mode of operation of the lid displacement device 240 in the present embodiment.

The lid displacement device 240 is preferably arranged on the outer wall of the base body 100 of the isolator 1 surrounding the connecting opening 120. The lid displacement device 240 preferably comprises a lid displacement drive 241, a gripping device 242 and a lid housing 243.

The lid displacement drive 241 is preferably formed by a pneumatic cylinder and can be controlled via the control unit. In the present embodiment, the lid displacement drive 241 is formed by two pneumatic cylinders.

The gripping device 242 preferably comprises a gripping unit 244 and a receiving plate 245, to which the gripping unit 244 is connected via a gripping unit displacement device 246.

The gripping unit 244 is preferably formed by at least one vacuum suction cup. In the embodiment shown, the gripping unit 244 comprises four vacuum cups, which are arranged essentially in a cross shape and in overlap with the surface of the lid D. The vacuum cups are preferably connected to the aforementioned vacuum pump via a pump connection not shown.

The gripping unit displacement device 246 can be controlled by the control device so that the gripping unit 244 can be moved/displaced in the direction of the longitudinal axis of the drum F. In the present embodiment, the gripping unit displacement device 246 is formed by two guide cylinders which are connected on the one hand to the receiving plate 245 and on the other hand to the gripping unit 244. As indicated by the arrow in FIG. 6 A, the guide cylinders can each be retracted or extended in a direction facing the lid D of the drum F, so that the gripping unit 244 can be moved between an initial position, in which the vacuum cups of the gripping unit 244 are spaced from the surface of the lid D, and a suction position, in which the vacuum cups are adjacent to the surface of the lid D by extending the guide cylinders. In this suction position, the lid D can be sucked in or gripped by the vacuum cups. The guide cylinders are then retracted so that the gripping unit 244—gripping the cover D—returns to its initial position. The lid D is removed from the opening of the drum F.

Furthermore, the gripping device 242 is preferably movably mounted relative to the connecting opening 120. In the present embodiment, two guide rails 247 are provided in this respect, which are arranged essentially in the Z-direction and are fastened to the outer wall of the base body 100.

The lid displacement drive 241 is preferably connected to the receiving plate 245 and can be controlled by the control device in such a way that the gripping device 242 can be moved or displaced along the guide rails 247. In this way, the gripping device 242 can be moved along the Z-direction between the initial position shown in FIGS. 6 A and B and an opening position indicated in FIG. 6 C, in which the gripping device 242 gripping the lid D s preferably displaced/moved upwards into the lid housing 243 along the positive Z-direction. The lid is therefore in a displaced state.

In addition, the receiving plate 245 of the gripping device 242 is further configured to cover the connecting opening 120 of the base body 100 in the initial position. Preferably, the receiving plate 245 can close the connecting opening 120 and thus the inner space of the base body in an airtight manner with respect to the outside environment. Alternatively, however, a gap may be formed or provided between the receiving plate 245 and the connecting opening 120 in the initial position. Due to the lower ambient pressure in the inner space of the base body 100, an air flow directed into the inner space of the base body 100 can be generated via this gap, which counteracts or at least reduces the emerging of product P from the inner space into the outside environment.

Figure 6C:
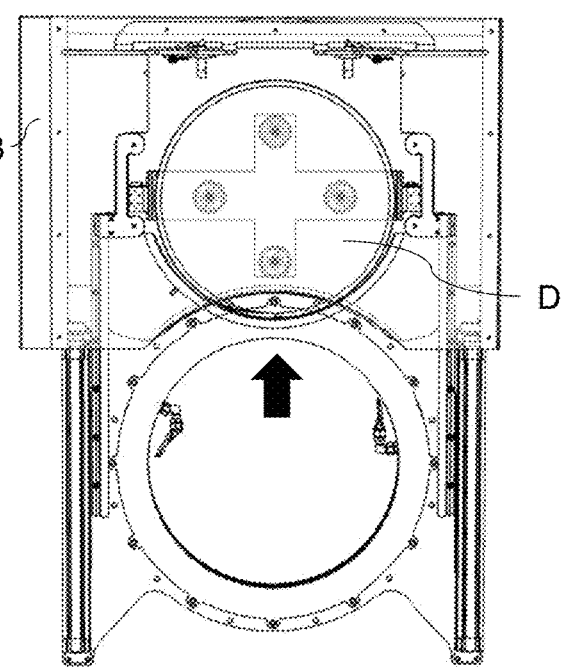

To release the connecting opening 120, the gripping device 242 is preferably moved to the opening position shown in FIG. 6C. In the opening position, the connecting opening 120 is thus preferably completely exposed due to the upwardly offset receiving plate 245, so that the drum F can be inserted at least in sections through the connecting opening 120 into the inner of the base body 100.

The lid displacement device 240 thus additionally forms a gate/airlock for the connecting opening 120 of the isolator 1.

The structure and mode of operation of the sealing device 250 according to the invention of the connecting device 2 will be described below with reference to FIGS. 7 A and B.

FIG. 7 A illustrates the structure of the sealing device 250 according to the invention in the present embodiment.

In the present embodiment, the sealing device 250 is preferably formed in the form of a sealing ring 251, which follows the inner contour of the connecting opening 120 of the base body 100 in a circumferential manner and preferably projects at least in sections into the inner of the base body 100. The sealing ring 251 is preferably attached to the outer wall of the base body 100 via a connecting plate 252. In FIG. 7 A, the surface of the connecting plate 252 that is in contact with the outer wall faces the viewer. The connecting plate 252 can preferably also serve to mount the lid displacement device 240.

Alternatively, the sealing device 250 can also be attached to the isolator 1 independently of the connecting device 2. For example, the sealing device 250 can also be attached directly to the connecting opening 120 or to the isolator 1. This is particularly preferable in the case of manual feeding/docking of the drum F.

An adjustable sealing element 253 is preferably arranged within the sealing ring 251. In the embodiment shown, the sealing element 253 is preferably formed by a toroidal inflatable seal. Preferably, the inflatable seal can alternatively have an L-shaped cross-section. Furthermore, the sealing device 250 comprises a pump connection, not shown, via which air can enter or exit the inflatable seal. In this respect, the pump connection is preferably connected to a compressed air supply so that the air pressure inside the inflatable seal can be increased. In addition, the sealing device 250 comprises an adjustment device, not shown, by means of which the air pressure within the inflatable seal can be adjusted. The adjustment device can preferably be controlled via the control device. When the air pressure is increased, the inflatable seal preferably expands, so that the expansion of the inflatable seal increases, whereas when the air pressure is reduced, it preferably relaxes, so that the expansion of the inflatable seal decreases.

In FIG. 7 B, the drum F is arranged in the emptying position, so that at least the opening of the drum F is inserted through the connecting opening 120 into the inner space of the base body 100. In this emptying position, the inflatable seal faces the outer wall of the drum F. In an initial state, in which the drum F is inserted through the connection opening 120, preferably only a low air pressure or no air pressure acts on the inflatable seal, so that it is relaxed and has a low expansion. In this way, a gap S is formed between the inflatable seal and the outer wall of the drum F. The gap S thus enables easy insertion/docking of the drum F into the inner space of the base body 120.

The mode of operation of the sealing device 250 is explained in detail below with reference to FIGS. 8 A to E.

To create a sealed state, the inflatable seal can be expanded under air supply to close the gap S. This state is illustrated schematically in FIG. 8 A. In the sealed state, the inflatable seal is thus pressed circumferentially and directly against the outer wall of the drum F, which is illustrated in FIG. 8 A by the dashed line. In this way, the inner space of the base body 100 is closed off from the outside environment in such a way that preferably no air exchange takes place between the inner space of the base body 120 and the outside environment. Consequently, in the sealed state there is a low risk of contamination for the product or the user when handling the powder/granular product in the inner space of the base body 100. In case, the inflatable seal has an L-shaped cross-section, it is preferably also pressed onto the end face of the rim of the drum F. In this way, the probability of the edge of the drum F coming into contact with the product can preferably be reduced.

Once the powder/granular product has been emptied into the base body 100, it is necessary to remove/dock the drum F from the inner space. In this respect, the sealing device 250 can preferably be moved from the sealed state to an at least partially open state, which is schematically illustrated in FIG. 8 B. For this purpose, the adjustment device adjusts the air pressure in the inflatable seal so that it is released and, as illustrated by the arrows pointing outwards in relation to the outer wall of the drum F, retracts so that the gap S is formed. Compared to the initial state formed for inserting the drum F, which is illustrated in FIG. 8 A, the gap S is preferably considerably smaller in the at least partially open state, so that an air flow directed into the interior of the base body 100 is generated due to the lower ambient pressure in the interior of the base body 100.

As indicated by the arrows in FIG. 8 B, this directed air flow preferably runs along the outer wall of the drum F and is preferably formed around the outer wall of the drum F. The directed air flow prevents powder/granular product from emerging from the inner space of the base body 100 to the outside environment. In addition, powder/granular product adhering to the inflatable seal itself can preferably be dissolved in this way and consequently sucked of via the air flow generated in the inner space, preferably via the pump connection 140. This also reduces the risk of contamination for the user when removing the drum F from the base body 100.

The gap S is preferably in a range between 0.1 mm-1 mm in the at least partially open state. In the initial state, however, in which the drum F is preferably inserted or removed, the gap S is preferably several centimeters. Furthermore, it is preferable that this small gap S is maintained for as long as possible, for at least 10 seconds. Alternatively, the at least partially open state can also be maintained for 15, 20, 25 or 30 seconds. The longer the at least partially open state can be maintained with the smallest possible gap S, the longer the directed air flow is provided with the highest possible flow velocity. Efficient and contamination-free undocking can be achieved by maintaining the open state for as long as possible.

FIGS. 8 C to E illustrate a preferred procedure for producing the at least partially open state. In this respect, FIGS. 8 C to E each show a longitudinal section in relation to the longitudinal axis of the drum F. FIG. 8 C again shows the sealed state, in which the inflatable seal is pressed circumferentially and directly against the outer wall of the drum F. To create the at least partially open state, the air pressure inside the inflatable seal is only reduced very slowly. As a result, the inflatable seal only relaxes very slowly. As explained above, the ambient pressure $P_I$ in the inner space of the base body 100 is preferably lower than an ambient pressure $P_A$ in the outside environment. As a result of this pressure difference, a force $F_P$ directed into the inner space of the base body 100 acts on the inflatable seal, as illustrated in FIG. 8 D. This force $F_P$ preferably causes the inflatable seal to be pulled away from the outer wall of the drum F in the direction of the inner space of the base body 100 and subsequently at least partially detaches from it when the air pressure inside the inflatable seal is reduced. As a result, the directional air flow described above can be generated. Accordingly, the at least partially open state can also be produced due to the force FP, which acts on the inflatable seal as a result of the difference between the ambient pressure PI in the interior of the base body 100 and the ambient pressure $P_A$ in the outside environment. FIG. 8 E again illustrates the initial state in which the drum F is preferably inserted or removed.

Preferably, the connecting device 2 may further comprise the blow-off device 260. The structure and operation of the preferred blow-off device 260 is explained below with reference to FIG. 9. In the embodiment shown, the blow-off device 260 comprises two compressed air nozzles 261 and 262 arranged in the inner space of the base body 100. In the embodiment shown, the compressed air nozzles 261 and 262 are attached to the sealing ring 251 of the preferred sealing device 250. However, the compressed air nozzles 261 and 262 can also be mounted elsewhere in the inner space of the base body 100. The compressed air nozzles 261 and 262 are preferably oriented substantially tangentially with respect to the inner wall of the drum F, with tips of the compressed air nozzles 261 and 262 pointing towards the bottom of the drum F. The compressed air nozzles 261 and 262 are connected to the compressed air supply and comprise an adjustment means, not shown, via which the compressed air supply can be switched on or off. The adjustment means can preferably be controlled by the control device.

The blow-off device 260 is preferably configured up to blow off the inner wall of the drum F after emptying has been completed, so that powder/granular product adhering to the inner wall is detached from the wall and can be sucked off via the pump connection 140 by the air flow generated in the inner space of the base body 100. In this respect, the compressed air nozzles 261 and 262 preferably trigger one or more short blasts of air, which whirl up the adhering product.

Preferably, a spiral-shaped air flow is thus generated within the drum F, as indicated in FIG. 9 as an example.

The control device, which is not shown, preferably comprises an operating device via which the user can operate the elements of the isolator 1 according to the invention that can be controlled by the control device and the preferred connecting device 2. Preferably, the elements can only be activated if the user continuously presses an operating button provided on the operating device. An example of a corresponding operating device is a two-hand control.

FIGS. 10 A to I show the intended method for connecting/docking the drum F to/from the isolator 1 according to the invention using the preferred connection device 2.

FIG. 10 A illustrates a preferred first step in which the drum F to be emptied is received by the holding device 220 as intended. Accordingly, only the holding device 220 is shown. To hold the drum F, the holding device 220 is preferably moved into the initial holding position by the lifting device 210, which is not shown. Preferably, before inserting the drum F, the clamping lever 2233 is released and the wings 2231 and 2232 of the drum clamp 223 are spread open in such a way that the drum F can be placed/slid onto the receiving plate 222 by the user. The wings 2231 and 2232 are then brought into contact with the outer wall of the drum F by the user and clamped by the clamping lever 2233 in such a way that the drum F is fixed within the holding device 220. In the state shown in FIG. 10 A, the suction device 224 and the fixing unit 2262 connected to the suction device 224 are preferably raised by the drive unit 2261. The guide cylinders of the fixing unit 2262 are preferably retracted. The suction device 224 is switched on and is already sucking off at this point. Preferably, the user first removes a clamp fixing the lid D to the drum F and then lifts the lid D slightly to release the adhesive seal between the lid D and the drum F. Any powder/granular product escaping in the course of this can be sucked off via the suction device 224. The drum F is therefore in a prepared state and can be connected to the isolator 1 from this prepared state without further handling by the user. The user now preferably turns to the operating device of the control unit.

In a preferred second step, the pre-loosened lid D is fixed to the drum F via the fixing device 226. First, the guide cylinders of the fixing unit 2262 are preferably actuated and extended via the control unit (arrows pointing inwards in FIG. 10 B), so that the fixing elements 2263 overlap the cover D. This state is illustrated in FIG. 10 B. Subsequently, the drive unit 2261 is preferably actuated via the control unit so that the suction device 224 together with the fixing unit 2262 are lowered (arrows pointing downwards in FIG. 10 C) in such a way that the fixing elements 2263 are pressed onto the surface of the lid D and fix it to the drum F. The state thus achieved is shown in FIG. 10 C.

In a preferred third step, the holding device 220 with the drum F fixed in it is moved into the tilted position by controlling the lifting device 210 via the control device. The resulting state is illustrated in FIG. 10 D.

In a preferred fourth step, the holding device 220 with the drum F fixed therein is moved from the tilted position in the direction of the connecting opening 120 of the base body 100 to an intermediate position by actuating the container transfer device 230 via the control device. As shown in FIG. 10 E, the lid D of the drum F is only slightly spaced from the vacuum cups of the gripping unit 244 in this state.

In a preferred fifth step, the lid D is removed from the drum F. In this respect, the guide cylinders of the gripping unit displacement device 245 are preferably first actuated and extended via the control device. The gripping unit 244 is thus preferably moved from the initial position to the suction position. The lid D is then sucked in via the vacuum cups. Subsequently, the drive unit 2261 is preferably activated via the control unit in order to raise the suction unit 224 and the fixing unit 2262 until the fixing elements 2263 are no longer in contact with the lid D. Now the guide cylinders of the fixing unit 2262 are preferably retracted under the control of the control device, so that the fixing elements 2263 no longer cover the lid D. In this way, the gripping unit 244—gripping the cover D—can then be moved back from the suction position to the initial position, preferably by actuating the gripping unit displacement device 245. As illustrated in FIG. 10 F, the drum F is thus preferably in the open state in the intermediate position.

In a preferred sixth step, the lid displacement drive 241 is actuated via the control device in such a way that the gripping device 242 gripping the lid D moves upwards from the initial position into the opening position. Thus, the lid D is now preferably accommodated in the lid housing 243 of the lid displacement device 240. Furthermore, the receiving plate 245 of the gripping device 242 preferably no longer closes the connecting opening 120 in the opening position. The inflatable seal of the preferred sealing device 250 is in the relaxed state at this point. In this way, the further movement/displacement path of the holding device 220 into the emptying position by means of the container transfer device 230 is preferably unobstructed. The state achieved is illustrated in FIG. 10 G.

In a seventh step, the container displacement device 230 is actuated via the control device in such a way that the holding device 220 is moved into the emptying position. Thus, at least the opening of the drum F is introduced into the inner space of the base body 100 through the connecting opening 120. The suction device 224 preferably strikes against the outer wall of the base body 100 in the course of this displacement movement and executes the relative movement while compressing the damping element 225. Furthermore, the adjustment device of the sealing device 250 is controlled in such a way that the air pressure within the inflatable seal is increased. As a result, the inflatable seal expands preferentially and is pressed against the outer wall of the drum F. The drum F is therefore in a sealed state in the emptying position. The drum F is therefore connected to the isolator 1. The state achieved is shown in FIG. 10 H.

The sixth and seventh steps can preferably be carried out simultaneously.

The user can now turn away from the operating device and face the front of the isolator 1. The user inserts his arms into the gloves via the ports 110 and, if necessary, opens the sealed foil bag in which the powder/granular product is enclosed. The user can then feed the powder/granulated product to the product guide 130. After emptying, the user preferably removes the remaining foil bag from the drum F and disposes of it via the waste portion 150. The emptying of drum F is now complete.

Now the user preferably turns back to the operating device and controls the adjustment means of the blow-off device 260 so that the compressed air nozzles 261 and 262 trigger one or more short blasts of air. As a result, the spiral-shaped air flow indicated in FIG. 10 I is preferably generated, which whirls up the powder/granular product adhering to the inner wall of the drum F. This powder/granular product is preferably subsequently extracted via the pump connection 140 inside the base body 100. The drum F is now prepared for transferring/undocking from/to the base body.

In an eighth step, the adjustment device of the preferred sealing device 250 is controlled via the control device in such a way that the air pressure within the inflatable seal is reduced. Preferably, the inflatable seal relaxes as a result and the gap S is formed in such a way that the air flow directed into the inner space of the base body 100 is generated. This means that any product released during discharge can be sucked into the inner space of the base body 100.

Finally, steps 1 to 7 are carried out in reverse order.

The preferable suction device 224 sucks off continuously during the entire aforementioned process.

All general explanations of the invention prior to the description of the figures apply equally to the embodiment.

The invention claimed is:

1. Isolator (1) for emptying a container (F) containing a powder/granular product, the isolator (1) comprising:
    a connecting device (2) for connecting a container (F) containing a powder/granular product to the isolator (1);
    a base body (100) which defines a connecting opening (120) via which an opening of the container (F) can be introduced at least in sections into an inner space of the base body (100) from an outside environment as intended, wherein
    a lower ambient pressure is generated in the inner space of the base body (120) than in the outside environment, and wherein
    the connecting device (2) comprises a sealing device (250) arranged at the connecting opening (120) and having an adjustable sealing element (251) which can be adjusted in such a way that it
        a) is pressed against an outer wall of the container (F) to produce a sealed state and closes the inner space from the outside environment, and
        b) is released from the outer wall of the container (F) to produce an at least partially open state in such a way that a gap(S) is formed between the sealing element (251) and the outer wall of the container (F), wherein
    the gap(S) is formed in such a way that an air flow directed into the inner space of the base body (120) is generated due to the different ambient pressure.

2. Isolator (1) according to claim 1, wherein
    the adjustable sealing element (251) is an inflatable seal formed from a resilient material running radially around the connecting opening (120).

3. Isolator (1) according to claim 2, wherein
    the sealing device (250) further comprises an adjustment device being configured to adjust an air supply, under which the inflatable seal expands, and an air withdrawal, under which the inflatable seal relaxes, wherein
    the adjustment device adjusts the air supply to produce the sealed state in such a way that the inflatable seal is pressed circumferentially against an outer wall of the container (F), and
    starting from the sealed state, the adjustment device adjusts the air extraction to produce the at least partially open state in such a way that the inflatable seal detaches at least in sections from the outer wall of the container (F) and forms the gap(S).

4. Isolator (1) according to claim 3, wherein the adjustment device is further configured to reduce the air pressure within the inflatable seal to generate the at least partially open state only very slowly by making the gap in the at least partially open state smaller than the gap(S) in a relaxed state in which the container is inserted into or removed from the interior of the base body (120).

5. Isolator (1) according to claim 2, wherein
    to produce the at least partially open state, the inflatable seal detaches at least in sections from the outer wall of the container (F) due to a force (FP) acting on the inflatable seal as a result of the difference between the ambient pressure in the inner space of the base body (100) and in the outside environment.

6. Isolator (1) according to claim 1, wherein
    in the sealed state, the difference between the ambient pressure in the inner space of the base body (100) and the outside environment is 0.1 bar.

7. Isolator (1) according to claim 1, wherein
    a time interval for establishing the at least partially open state is 10 seconds.

8. Isolator (1) according to claim 1, wherein
    a time interval for establishing the at least partially open state is 15 seconds.

9. Isolator (1) according to claim 1, wherein
    a time interval for establishing the at least partially open state is 20 seconds.

10. Isolator (1) according to claim 1, wherein
    a time interval for establishing the at least partially open state is 25 seconds.

11. Isolator (1) according to claim 1, wherein
    a blow-off device (260) is provided in a region of the connecting opening, which is arranged tangentially with respect to an inner wall of the container (F) and is configured up to blow off the inner wall of the container (F) before the at least partially open state is established in such a way that powder/granular product adhering to the inner wall is detached and sucked off.

\* \* \* \* \*